T. MIDGLEY.
CUSHION TIRE.
APPLICATION FILED JULY 28, 1913.
1,176,159.
Patented Mar. 21, 1916.
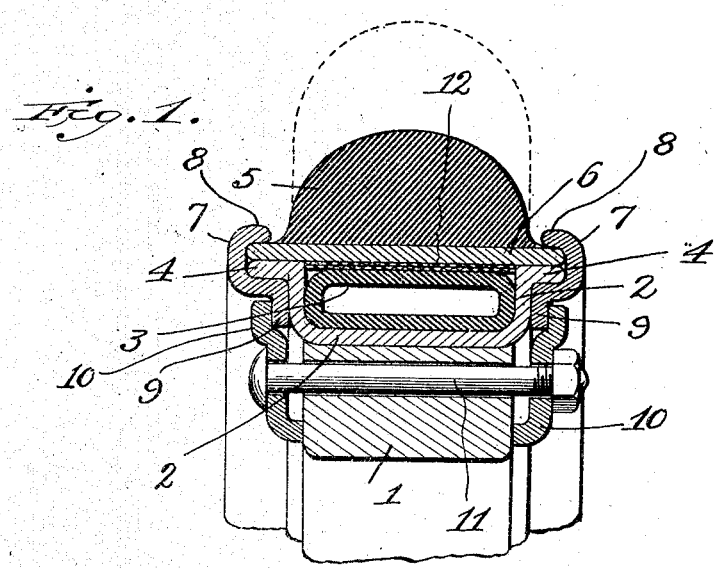
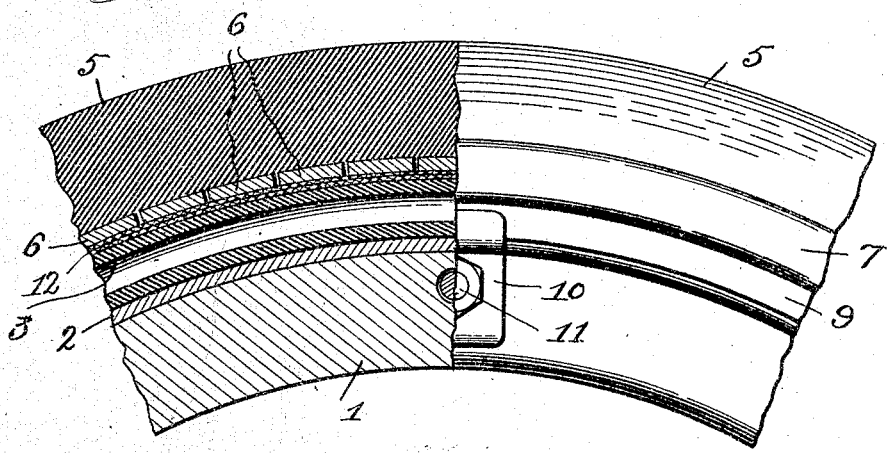
Witnesses
Edwin L. Jewell
A. L. Mills
Inventor
Thomas Midgley
By Percy B. Hills
Attorney

UNITED STATES PATENT OFFICE.

THOMAS MIDGLEY, OF WORTHINGTON, OHIO, ASSIGNOR TO MORGAN & WRIGHT, OF DETROIT, MICHIGAN, A CORPORATION OF MICHIGAN.

CUSHION-TIRE.

1,176,159.  Specification of Letters Patent.  Patented Mar. 21, 1916.

Application filed July 28, 1913. Serial No. 781,537.

*To all whom it may concern:*

Be it known that I, THOMAS MIDGLEY, a citizen of the United States, residing at Worthington, in the county of Franklin, State of Ohio, have invented certain new and useful Improvements in Cushion-Tires; and I do hereby declare the following to be a full, clear, and exact description of the invention, such as will enable others skilled in the art to which it appertains to make and use the same.

My invention relates to cushion tires for vehicles, and has for its main object to provide in connection with the usual solid rubber tread in such devices a pneumatic cushion which will add to the resiliency of said tread, and which will effectively be protected against puncture.

My invention also contemplates certain other minor novel features, as will be hereinafter more definitely pointed out and claimed, reference being had to the accompanying drawing, in which:

Figure 1 is a transverse sectional view of my improved tire shown mounted on its wheel felly. Fig. 2 is a view partly in longitudinal section and partly in elevation of the same.

Similar numerals of reference denote corresponding parts in the two views.

In the said drawing the reference numeral 1 denotes the usual wooden felly of the vehicle wheel, on which is mounted a channel plate 2, formed preferably of cold rolled steel, the same extending in one piece entirely around said felly. Disposed in said channel plate 2 and prevented from lateral expansion by the side walls of said channel plate is an inflatable tube 3, said channel plate and felly being apertured at some suitable point to permit the passage therethrough of the usual inflating valve tube (not shown) of said tube 3. Resting upon the out-turned flanges 4 of the channel plate 2 is the solid rubber tread 5, to the inner face of which is fixed by vulcanization a series of transverse strips 6 formed preferably of suitable metal, said strips when the parts are in position resting upon the flanges 4 of channel plate 2. Extending integrally around each side of the channel plate 2 is a clamping ring 7, the same at its outer inturned edge 8 engaging over the ends of the transverse strips 6 to retain the latter, together with the rubber tread 5, firmly in position. Engaging at intervals with and retaining the inner flanges 9 of said clamping rings 7 are a series of clamps 10 which are in turn bolted to the felly 1 by means of the transverse bolts 11.

In operation the channel plate 2 with its inflating tube 3 therein is first placed on the felly 1. The rubber tread 5 with its attached strips 6 is then placed in position, a band 12, composed of one or a plurality of layers of fabric vulcanized together, preferably being interposed between said tube 3 and the surface of said plates 6. The clamping rings 7 are then positioned, and are locked in position by the clamps 10 and bolts 11, thus holding firmly all the parts in their adjusted positions.

By employing the inflatable tube 3 I provide an additional resilient support for the rubber tread 5, the transverse strips 6, which rest at their ends on the flanges 4 of channel plate 2, being supported centrally by said inflatable tube whereby any yield therein will be absorbed by said tube 3. At the same time while said tube is protected most effectually against puncture, its deflation will by no means put the tire out of operation, as the support for the strips 6 at their ends upon the flanges 4 will be sufficient to enable the tire to be used until said tube can be replaced or repaired. And while I have shown said strips as formed flat, the same may if desired be formed either slightly concaved or convexed from end to end, as may be desired.

It has been found in practice in the use of solid rubber tires that because of the unyielding base heretofore employed with the same the rubber of the tread tends to rupture diagonally near its edges where it is joined to its base plate. This tendency to rupture I overcome not alone because of the use of the inflatable tube 3 but also by forming the base of the tread of the separate transverse strips 6 which yield more readily than would a continuous base band. Furthermore, with my improved construction a decided reduction in the thickness of the rubber tread 5 will give the best results. This reduction in size not only cheapens the cost of the tire with respect to the amount of rubber required, but also lessens the liability of the tread to crack or break away from its base.

While I prefer to form the transverse strips 6 of metal, still I do not wish to limit myself to such material, as the same might be formed of stiffened fabric, leather or other suitable semi-flexible material.

Having thus described my invention, what I claim as new and desire to secure by Letters Patent is:

1. A cushion tire, embodying a tread surface of rubber, a base plate of stiffening material for said tread surface, means for securing the sides of said plate in fixed positions to form a rigid resistance for the thrust from the sides of said tread, and an inflatable tube disposed beneath said base plate.

2. A cushion tire, embodying a tread surface of rubber, a base plate for said tread surface composed of a series of transverse metal plates disposed side by side, means for securing the sides of said plates in fixed positions to form a rigid resistance for the thrust from the sides of said tread, and an inflatable tube disposed beneath said base plate.

3. A cushion tire, embodying a tread surface of rubber, a base plate for said tread surface, a channel plate upon which the edges of said base plate rest for forming a rigid resistance for the thrust from the sides of said tread, and an inflatable tube disposed within said channel plate and yieldingly receiving the thrust of the center of said tread base plate.

4. A cushion tire, comprising a tread surface of rubber, a base for said tread surface consisting of a series of transverse plates, a channel plate having a central longitudinal depression and having side flanges upon which the sides of said tread base plates rest for forming a rigid resistance for the thrust from the sides of said tread, and an inflatable tube disposed in the longitudinal depression in said channel plate and yieldingly receiving the thrust of the centers of said tread base plates.

5. A cushion tire, comprising a tread surface of rubber, a base therefor composed of transverse metal plates, a channel plate supporting said base plates at their sides, an inflatable tube within said channel plate and in contact with said tread plates intermediate their length to receive in part the thrust of the tread, clamping rings engaging and clamping said channel plate and tread plates together, and means for clamping said rings to the vehicle wheel felly.

6. A cushion tire, comprising a tread surface of rubber, a base therefor composed of transverse metal plates, a channel plate supporting said base plates at their sides, an inflatable tube within said channel plate and in contact with said tread plates intermediate their length to receive in part the thrust of the tread, clamping rings engaging and clamping said channel plate and tread plates together, a series of clamps engaging said rings and the vehicle wheel felly, and bolts for fastening said clamps to the vehicle wheel felly.

In testimony whereof I have hereunto set my hand in the presence of two subscribing witnesses.

THOMAS MIDGLEY.

Witnesses:
JOHN CARLSON,
J. H. SWIFT.